(12) United States Patent
Tanigawa

(10) Patent No.: US 11,861,055 B2
(45) Date of Patent: Jan. 2, 2024

(54) VIRTUAL REALITY SYSTEM, PROGRAM, AND COMPUTER-READABLE STORAGE MEDIUM

(71) Applicant: Five for Co., Ltd., Tokyo (JP)

(72) Inventor: Takayoshi Tanigawa, Tokyo (JP)

(73) Assignee: Five for Co., Ltd., Tokyo (JP)

(*) Notice: Subject to any disclaimer, the term of this patent is extended or adjusted under 35 U.S.C. 154(b) by 522 days.

(21) Appl. No.: 17/051,208

(22) PCT Filed: Oct. 31, 2019

(86) PCT No.: PCT/JP2019/042942
§ 371 (c)(1),
(2) Date: Oct. 28, 2020

(87) PCT Pub. No.: WO2020/261595
PCT Pub. Date: Dec. 30, 2020

(65) Prior Publication Data
US 2023/0152879 A1    May 18, 2023

(30) Foreign Application Priority Data
Jun. 28, 2019 (JP) .................... 2019-121713

(51) Int. Cl.
*G06F 3/01* (2006.01)
*G06F 3/033* (2013.01)
*G06T 19/00* (2011.01)

(52) U.S. Cl.
CPC .............. *G06F 3/011* (2013.01); *G06F 3/033* (2013.01); *G06T 19/003* (2013.01)

(58) Field of Classification Search
CPC .......... G06F 3/011; G06F 3/033; G06T 19/003
See application file for complete search history.

(56) References Cited

U.S. PATENT DOCUMENTS

| | | | |
|---|---|---|---|
| 2012/0038669 A1* | 2/2012 | Lee | G06T 19/006 345/633 |
| 2014/0300532 A1* | 10/2014 | Karkkainen | G06F 3/015 345/156 |
| 2015/0363647 A1* | 12/2015 | Perez | G06V 20/20 345/633 |
| 2017/0262050 A1* | 9/2017 | Li | A63F 13/21 |

FOREIGN PATENT DOCUMENTS

JP    2019066805 A    4/2019

* cited by examiner

Primary Examiner — Doon Y Chow
(74) Attorney, Agent, or Firm — Maier & Maier, PLLC

(57) ABSTRACT

A virtual reality system 1 includes a display unit 13 that displays a video 100, a control unit 21 that controls a change of the video 100 displayed on the display unit 13, an origin position setting unit 14 that sets an origin position X, a current position recognition unit 15 that detects and recognizes a current position Y of a user U, and a progress direction setting unit 16 that calculates a direction of the current position Y recognized by the current position recognition unit 15 with respect to the origin position X set by the origin position setting unit 14, and sets a progress direction in the displayed video 100 in accordance with the direction, and the control unit 21 controls a change of the video 100 to cause the video 100 to progress in a progress direction set by the progress direction setting unit 16.

15 Claims, 9 Drawing Sheets

VIRTUAL REALITY SYSTEM, PROGRAM, AND COMPUTER-READABLE STORAGE MEDIUM

FIELD

The present invention relates to a virtual reality system, a program, and a computer-readable storage medium, and particularly relates to a virtual reality system including a video display apparatus worn on a user to display a virtual reality video, a program, and a computer-readable storage medium.

BACKGROUND

In recent years, a system (virtual reality system) that allows users to experience virtual reality has become widespread. The virtual reality system is a system in which a user wears a video display apparatus and a video displayed on the video display apparatus is three-dimensionally and continuously changed according to a position of the user, and the user can enjoy virtual reality.

For such a virtual reality system, for example, a technology disclosed in Patent Document 1 can be referred to.

CITATION LIST

Patent Document 1: JP-A-2017-195365

SUMMARY

Incidentally, in a conventional virtual reality system, a progress direction of a displayed video is set to a user facing direction in many cases. However, it is desired to develop a system that sets the progress direction in a direction from an origin position.

The invention has been made in view of the above circumstances, and an object of the invention is to provide a virtual reality system, a program, and a computer-readable storage medium capable of setting a progress direction in a direction from an origin position.

To achieve the above object, a virtual reality system according to the invention is a virtual reality system having a video display apparatus worn on a user to display a video of virtual reality, including a display unit that displays the video, a control unit that controls a change of the video displayed on the display unit, an origin position setting unit that sets an origin position, a current position recognition unit that detects and recognizes a current position of the user, and a progress direction setting unit that calculates a direction of the current position recognized by the current position recognition unit with respect to the origin position set by the origin position setting unit, and sets a progress direction in the displayed video in accordance with the direction, characterized in that the control unit controls a change of the video to cause the video to progress in a progress direction set by the progress direction setting unit.

According to the invention, since the control unit controls a change of the video to cause the video to progress in the progress direction set by the progress direction setting unit, the progress direction can be set in a direction from the origin position.

If a motion detector that detects a predetermined motion of the user is included, and the control unit controls a change of the video to cause the video to progress in a progress direction set by the progress direction setting unit when a predetermined motion of the user is detected by the motion detector, it is possible to change a video of virtual reality in accordance with a predetermined motion of the user.

The motion detector may detect at least one of a speed, acceleration and an angular velocity in a motion of the user, and the control unit may control a change of the video when acceleration and/or an angular velocity detected by the determination unit is a predetermined value.

Display of the video may include a predetermined display object. When the predetermined display object includes a display object indicating a progress direction set by the progress direction setting unit, a progress direction can be confirmed by the display object.

A display state of the display object may be changed in accordance with a distance from the origin position to the current position.

That is, for example, the position of the display object may be changed in accordance with a distance from the origin position to the current position, and the size of the display object may be changed in accordance with a distance from the origin position to the current position.

In this way, the user can subjectively detect the distance from the origin position to the current position.

The control unit may change the speed of a change of the video in accordance with acceleration and/or an angular velocity in the motion of the user detected by the motion detector.

When a change of the video by the control unit includes a change of video for causing the video to progress in a progress direction set by the progress direction setting unit and a change of the video other than the change, a controller operated by the user to transmit predetermined command information is included, the controller is configured to be communicable with the video display apparatus, and transmits the received command information to an input unit of the video display apparatus, and the change of the video by the control unit is further performed according to the command information input by the input unit, it is possible to change the video in accordance with predetermined command information from the user.

The control unit, the origin position setting unit, the current position recognition unit, the progress direction setting unit, the motion detector, the threshold value setting unit, the determination unit, and the input unit may be included in the video display apparatus.

The virtual reality system may have a sign indicating the origin position.

That is, for example, the virtual reality system may have a floor, a ground, or a rug on which the user rides, including the sign in the real world.

The sign may have a three-dimensional shape.

When such a sign is included, the user can recognize an origin position in the real world.

The display of the video of the virtual reality may be display of a three-dimensional virtual reality video.

To achieve the above object, a program according to the invention causes a computer of a virtual reality system including a video display apparatus worn on a user to display a video of virtual reality to function as a display unit that displays the video, a control unit that controls a change of the video displayed on the display unit, an origin position setting unit that sets an origin position, a current position recognition unit that detects and recognizes a current position of the user, a progress direction setting unit that calculates a direction of the current position recognized by the current position recognition unit with respect to the origin position set by the origin position setting unit, and sets a progress direction in the displayed video in accordance with the direction, and a motion detector that detects a predetermined motion of the user, and is characterized in that the control unit has a function of controlling a change of the video to cause the video to progress in a progress direction set by the progress direction setting unit when a predetermined motion of the user is detected by the motion detector.

To achieve the above object, a computer-readable storage medium according to the invention is characterized by being configured to be able to store the program.

According to the invention, it is possible to change a virtual reality video according to a predetermined motion of a user.

BRIEF DESCRIPTION OF THE DRAWINGS

FIG. 8 is a diagram illustrating a state in which the user performs a predetermined motion at the current position in the virtual reality system, in which FIG. 8(a) is a diagram illustrating a state in which the user lifts a leg, and FIG. 8(b) is a diagram illustrating a state in which the leg of the user is put on a ground.

DETAILED DESCRIPTION

Figure 1:
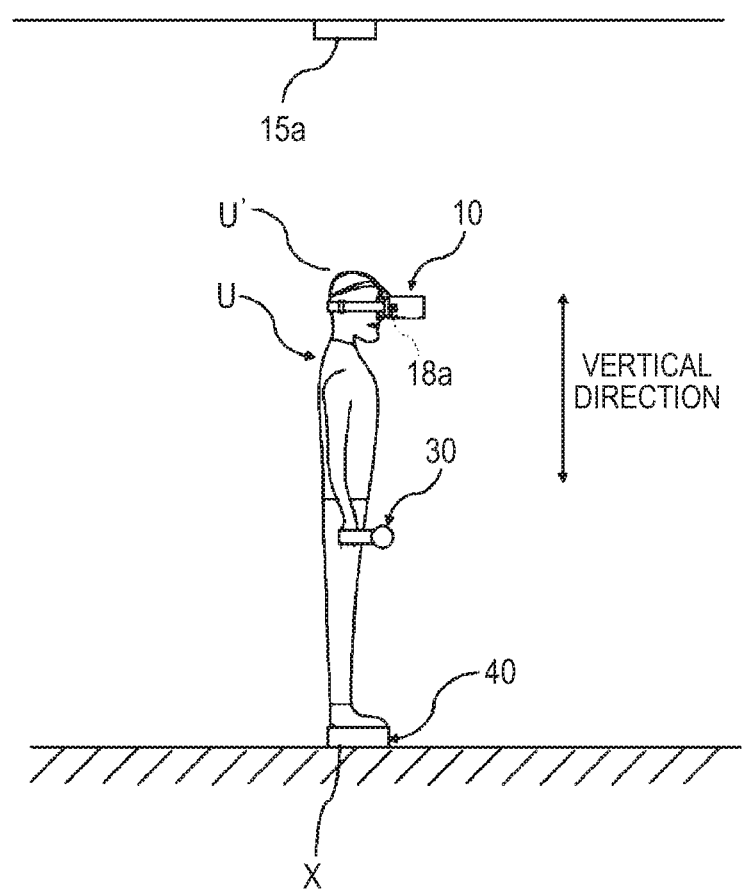
FIG. 1 is a diagram illustrating an outline of an overall configuration of a virtual reality system according to the embodiment of the invention.
Figure 2:
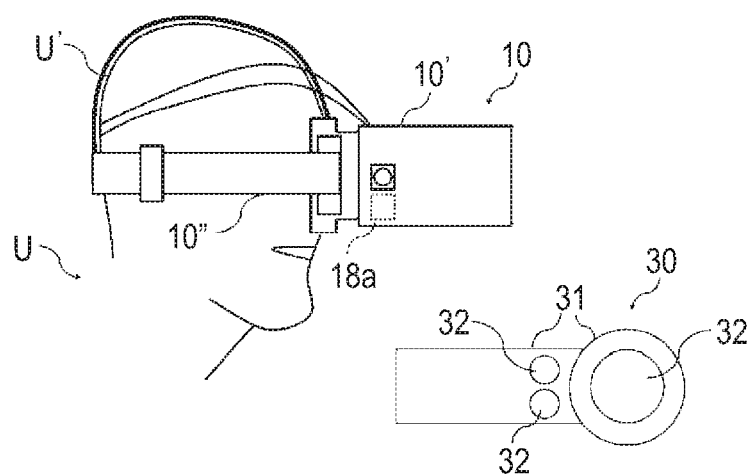
FIG. 2 is an enlarged view illustrating a video display apparatus and a controller of the virtual reality system in an enlarged manner.
Figure 3:
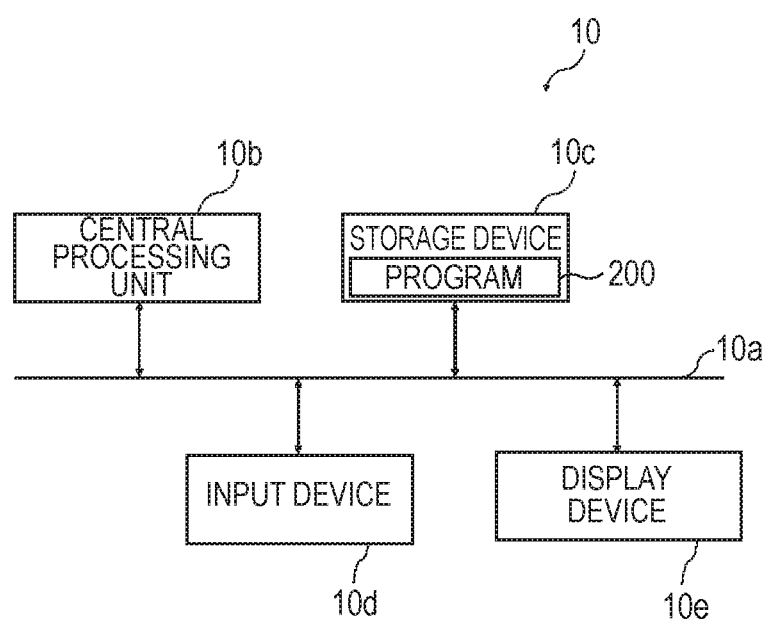
FIG. 3 is a block diagram illustrating a configuration of a computer of the video display apparatus of the virtual reality system.
Figure 4:
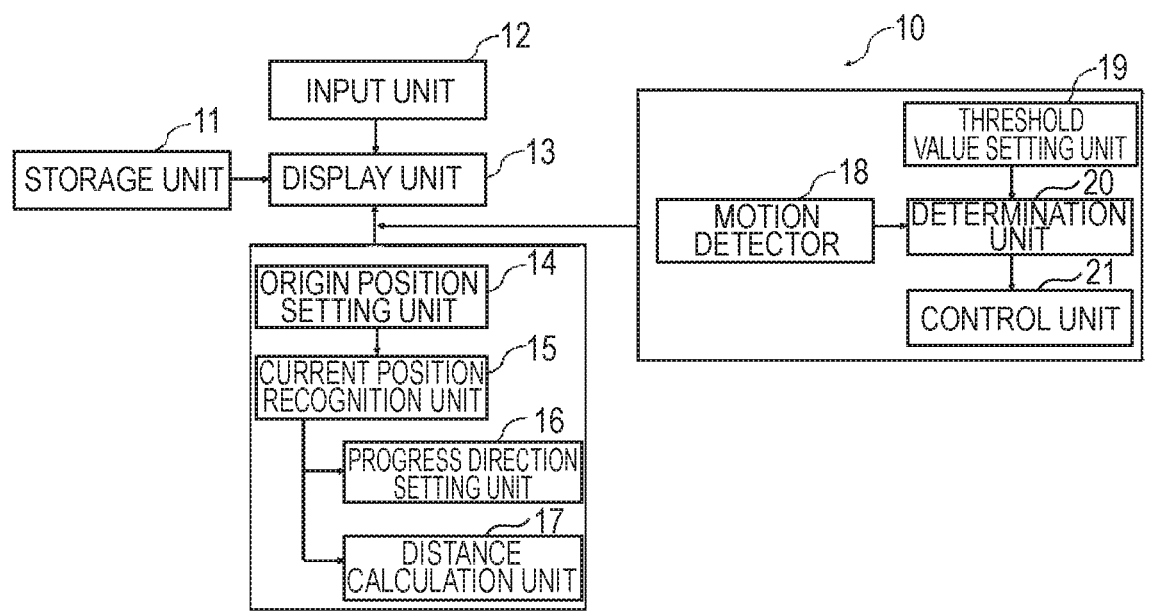
FIG. 4 is a functional block diagram illustrating a configuration of functional blocks of the computer of the video display apparatus of the virtual reality system.
Figure 5:
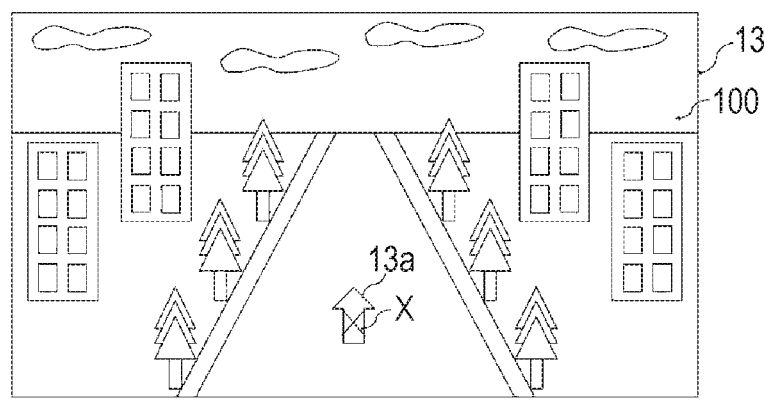
FIG. 5 is a diagram illustrating a display example of the video display apparatus of the virtual reality system.
Figure 6:
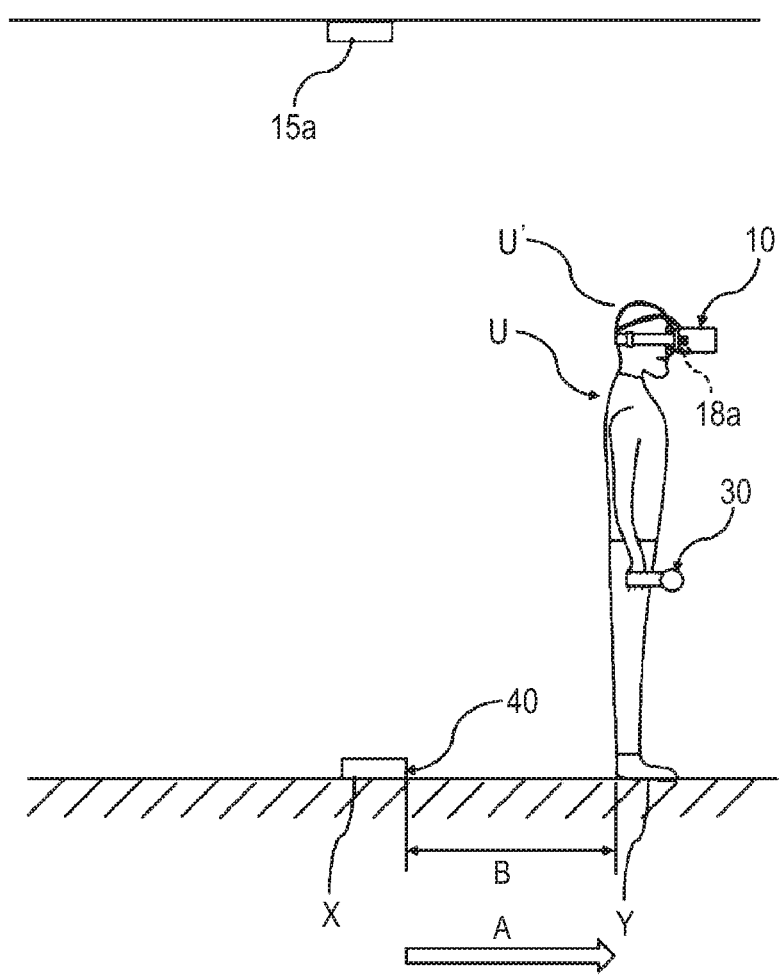
FIG. 6 is a diagram illustrating a state in which a user moves from an origin position to a current position in the virtual reality system.
Figure 7:
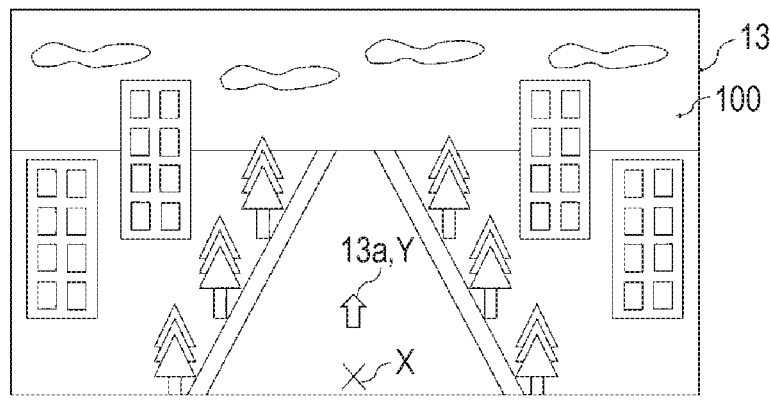
FIG. 7 is a diagram illustrating a state in which the display progresses from the origin position to the current position and a video changes in the virtual reality system.
Figure 8:
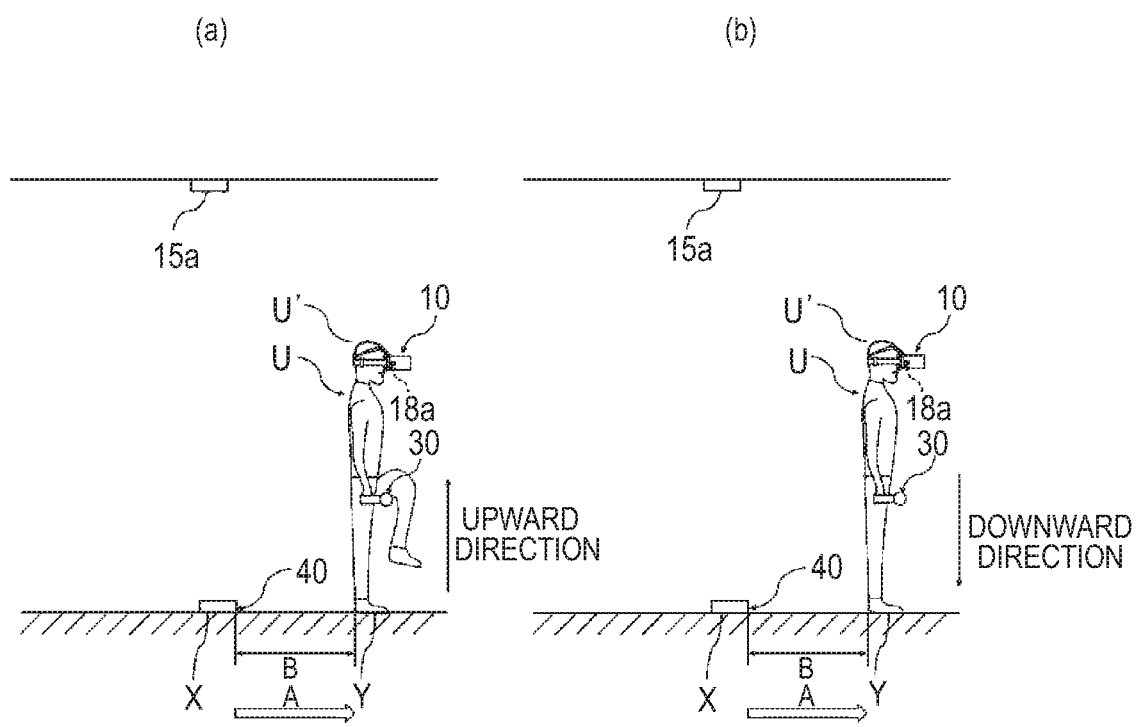

Hereinafter, the embodiment of the invention will be described in detail with reference to the drawings. FIG. 1 is a diagram illustrating an outline of an overall configuration of a virtual reality system according to an embodiment of the invention, FIG. 2 is an enlarged view illustrating a video display apparatus and a controller of the virtual reality system in an enlarged manner, FIG. 3 is a block diagram illustrating a configuration of a computer of the video display apparatus of the virtual reality system, FIG. 4 is a functional block diagram illustrating a configuration of functional blocks of the video display apparatus of the virtual reality system, FIG. 5 is a diagram illustrating a display example of the video display apparatus of the virtual reality system, FIG. 6 is a diagram illustrating a state in which a user moves from an origin position to a current position in the virtual reality system, FIG. 7 is a diagram illustrating a state in which display progresses from the origin position to the current position and a video changes in the virtual reality system, and FIG. 8 is a diagram illustrating a state in which the user performs a predetermined motion at the current position in the virtual reality system. Note that in the present embodiment, each direction is based on a direction illustrated in the drawing.

The outline of the virtual reality system 1 of the invention will be described with reference to FIG. 1. The virtual reality system 1 of the present embodiment includes a video display apparatus 10, a controller 30, and a sign 40, and can provide a display of a virtual reality video 100. A display of virtual reality can be a display of virtual reality in a three-dimensional space.

As illustrated in FIG. 2, the video display apparatus 10 is worn on a head U' of a user U using the virtual reality system 1 and can display the video 100 in a field. The video display apparatus 10 includes a main body 10' capable of displaying the video 100 in the field, and a fixing portion 10" for fixing the main body 10' to the head U' of the user U. The fixing portion 10" is in a shape of a band or a string, and a length of the fixing portion 10" is adjustable so as to be compatible with various sizes of the head U' of the user U. Note that the video display apparatus 10 may be a head mount display or a headset. Further, the video display apparatus 10 may have a glass type (glasses type).

The video display apparatus 10 has a general configuration as a computer, and includes a central processing unit (CPU) 10b, a storage device (memory) 10c, an input device 10d, a display device (liquid crystal display) 10e, etc. mutually connected via a bus 10a as illustrated in FIG. 3. A function of the storage device 10c is performed by a storage unit 11 described later, and the storage device 10c functions as a computer-readable storage medium. A function of the input device 10d is performed by an input unit 12 described later, and a function of the display device 10e is performed by a display unit 13 described later.

As illustrated in FIG. 4, the video display apparatus 10 has respective functional units of the storage unit 11, the input unit 12, the display unit 13, an origin position setting unit 14, a current position recognition unit 15, a progress direction setting unit 16, a distance calculation unit 17, a motion detector 18, a threshold value setting unit 19, a determination unit 20, and a control unit 21.

The storage unit 11 can store the video 100 in various fields displayed by the display unit 13.

The input unit 12 can input various information, data, and signals from the controller 30, a sensor described later, etc.

As illustrated in FIG. 5, the display unit 13 can read and display the video 100 of the field from the storage unit 11. The display of the video 100 of the field on the display unit 13 may include a predetermined display object 13a, more specifically, the display object 13a indicating a progress direction A. The display object 13a may be, for example, an arrow, and may include an animal such as a bird, or various characters. The progress direction A indicated by the display object 13a may be, for example, a direction indicated by the arrow, a direction in which an animal or a character is headed, etc.

The origin position setting unit 14 can set an original position X in virtual reality, more specifically in the video 100 of the field. Referring to setting of the origin position X, the origin position X can be input and set as the origin position X in display of the video 100 in the field of virtual reality by operating the controller 20 as necessary while the user U is located at a predetermined position in the real world such as a floor, a ground, or a rug. The origin position X can be input by a signal from the controller 30 via the input unit 12.

The current position recognition unit 15 can detect and recognize a current position Y of the user U. The current position recognition unit 15 can recognize the current position Y of the user U by input of detection data or image data from a position detector 15*a* such as a position detection center, a camera, etc. for detecting the position of the user U provided on the floor, ceiling and wall, etc. The current position recognition unit 15 may have an image analysis function for analyzing the image data input from the camera to recognize the position of the user U. Input of the detection data or the image data from the position detector 15*a* such as the position detection center, the camera, etc. can be performed via the input unit 12.

As illustrated in FIG. 6, the progress direction setting unit 16 can calculate a direction of a vector of the current position Y recognized by the current position recognition unit 15 with respect to the origin position X set by the origin position setting unit 14. Then, the progress direction setting unit 16 can set the progress direction A in the video 100 of the field displayed on the display unit 13 according to the calculated vector direction.

Likewise, as illustrated in FIG. 6, the distance calculation unit 17 can calculate a distance B from the origin position X set by the origin position setting unit 14 to the current position Y recognized by the current position recognition unit 15.

Here, according to the distance B from the origin position X to the current position Y calculated by the distance calculation unit 17, it is possible to change the display state of the display object 13*a* on the display unit 13. More specifically, according to the distance B from the origin position X to the current position Y calculated by the distance calculation unit 17, as illustrated in FIG. 7, it is possible to change the position of the display object 13*a* on the display unit 13.

For example, when the distance B from the origin position X to the current position Y is relatively long, the display object 13*a* can be displayed at a position relatively distant from the origin position X. When the distance B from the origin position X to the current position Y is short, the display object 13*a* can be displayed at a position relatively close to the origin position X.

In addition, likewise, as illustrated in FIG. 7, according to the distance B from the origin position X to the current position Y calculated by the distance calculation unit 17, it is possible to change the size of the display object 13*a* on the display unit 13 (the size of the display object 13*a* of FIG. 7 is smaller than the size of the display object 13*a* of FIG. 5). For example, when the distance B from the origin position X to the current position Y is relatively long, the display object 13*a* can be displayed relatively small, and when the distance B from the origin position X to the current position Y is short, the display object 13*a* can be displayed relatively large.

The motion detector 18 can detect a predetermined motion of the user U. More specifically, the motion detector 18 can detect acceleration in the motion of the user U. The motion detector 18 can detect acceleration by input from an acceleration sensor 18*a*. Input from the acceleration sensor 18*a* can be performed via the input unit 12. For example, the acceleration sensor 18*a* can be provided in the video display apparatus 10.

The threshold value setting unit 19 can set a predetermined value, more specifically a threshold value of predetermined acceleration. For setting the threshold value by the threshold value setting unit 19, for example, a threshold value stored in the storage unit 11 in advance can be set by reading an ON signal of a power source of the virtual reality system 1 as a kick signal.

The determination unit 20 can determine a magnitude relationship between the threshold value set by the threshold value setting unit 19 and the acceleration detected by the motion detector 18.

As illustrated in FIG. 8, the control unit 21 can control the change of the video 100 so that when a predetermined motion of the user U is detected by the motion detector 18, the video 100 of the field is progressed in the progress direction A set by the progress direction setting unit 16 according to the distance B calculated by the distance calculation unit 17 (FIG. 8 illustrates a state in which the user U lifts a leg at the current position Y). That is, the control unit 21 can control the change of the video 100 when the determination unit 20 determines that the detected acceleration is larger than the threshold value.

Here, the threshold value of the acceleration is set to a value larger than the acceleration of normal movement of the user U from the origin position X to the current position Y. By setting the threshold value of the acceleration to a value larger than usual, the motion of the user U detected by the motion detector 18 can be distinguished from a normal motion of movement of the user U from the origin position X to the current position Y. As illustrated in FIG. 8, the motion of the user U can be a motion of obtaining predetermined acceleration such as a jump, a dash, or a waving, in addition to a predetermined motion of lifting the leg in the vertical direction.

That is, the video 100 of the field by the display unit 13 is in a stopped state (state of FIG. 5) in normal movement of the user U from the origin position X to the current position Y (state of FIG. 6), and only when the user U performs a predetermined motion (state of FIG. 8), and the determination unit 20 determines that the detected acceleration is larger than the threshold value, the video 100 in the stopped state (state of FIG. 5) can be set to the video 100 (state of FIG. 7) in a state of being changed to progress in the progress direction A by the distance B by the control unit 21. That is, the user U can intend the change of the video 100 in the field by a motion of the user U, and can avoid a feeling of getting drunk in advance.

Note that the control unit 21 can perform a control operation to change the speed of the change of the video 100 in the field in accordance with the acceleration and/or an angular velocity in the motion of the user detected by the motion detector 19, and cause the display unit 13 to perform display.

For example, when the distance B from the origin position X to the current position Y is relatively long, the speed of the change of the video 100 in the field can be set to be relatively large. Further, when the distance B from the origin position X to the current position Y is short, the speed of the change of the video 100 in the field can be set to be relatively small. In this way, even when the distance B from the origin position X to the current position Y is different, it is possible to make a video change time for progressing in the progress direction A of the video 100 constant, and it is possible to reduce stress on the user U.

The controller 30 is provided with, for example, a button-shaped operation unit 32 allowing the user U to perform a desired operation on a main body 31. That is, in the controller 30, the user U can operate the operation unit 32 as necessary to transmit predetermined command information. More specifically, the controller 30 is configured to be communicable with the video display apparatus 10 and can transmit command information to the input unit 11 of the video display apparatus 10. The command information includes information for starting the display of virtual reality, information for selecting a predetermined video 100 from videos 100 in a plurality of fields stored in the storage unit 11, etc.

The sign 40 can indicate the origin position X in the real world. The sign 40 can be provided on the floor, the ground, or the rug on which the user U rides in the real world. The sign 40 may have a three-dimensional shape, the three-dimensional shape may have a protruding shape protruding toward the user U, and the protruding shape may have a shape protruding upward. By standing on or near the sign 40 and operating the controller 30 as necessary, the user U can input and set the position of the sign 40 (or a position near the sign 40), that is, an origin position X of the real world, and match the origin position X of the real world with the origin position X of the virtual reality, that is, the origin position X in the display of the video 100 in the field of virtual reality.

Here, each functional unit of the video display apparatus 10 described above can function by executing a predetermined program 200.

That is, the program 200 can cause the computer of the virtual reality system 1 to function as the storage unit 11, the input unit 12, the display unit 13, the origin setting unit 14, the current position recognition unit 15, the progress direction setting unit 16, the distance calculation unit 17, the motion detector 18, the threshold value setting unit 19, the determination unit 20, and the control unit 21. The program 200 is stored in the storage device 10c of the video display apparatus 10.

Figure 9:
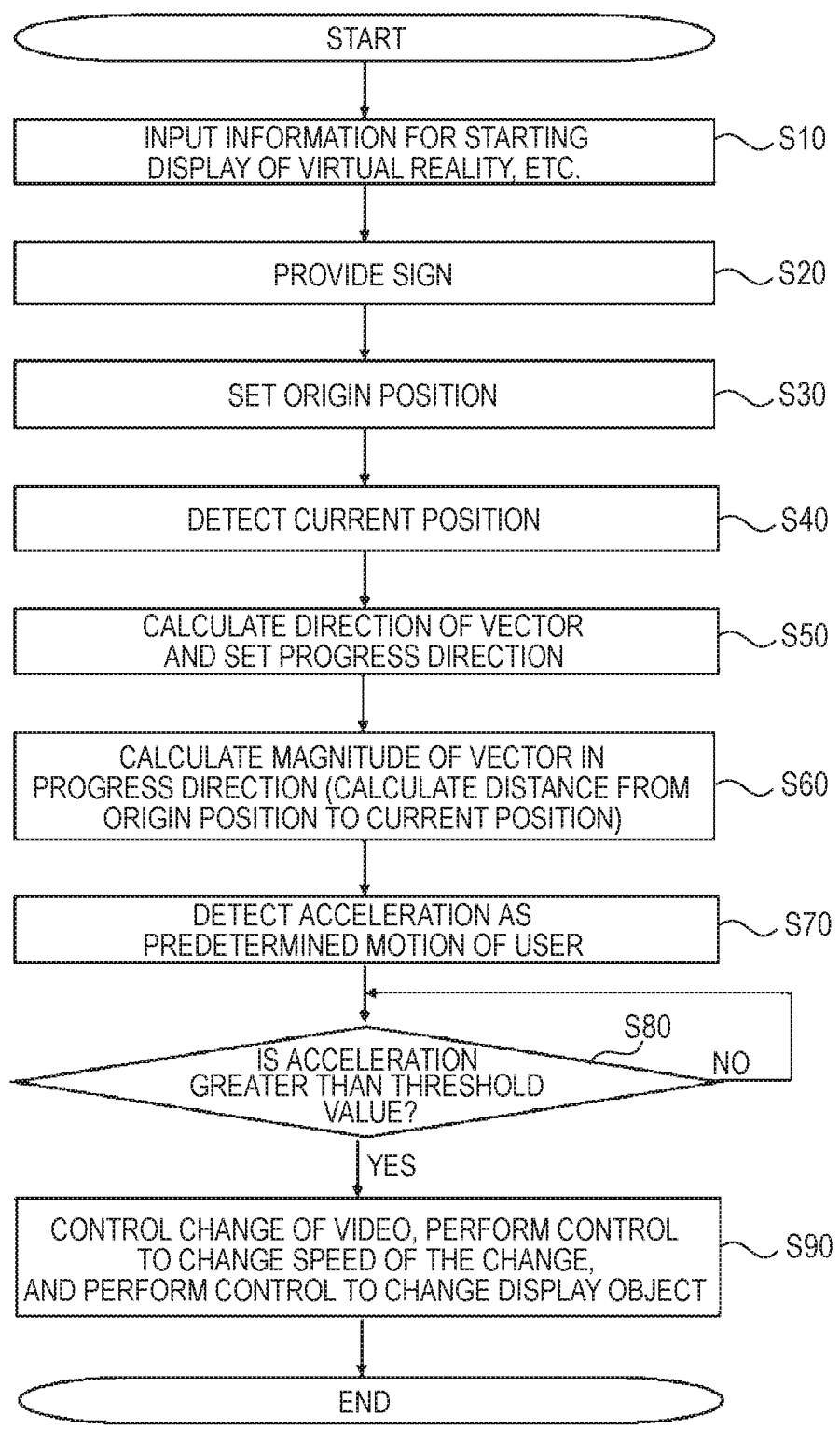
FIG. 9 is a flowchart for description of a video display method by the virtual reality system.

Next, a description will be given of a method of displaying the video 100 by the virtual reality system 1 of the invention based on a flowchart of FIG. 9.

That is, first, instep S10, the user U turns ON the power source of the virtual reality system 1 and operates the operation unit 32 of the controller 30 as necessary to transmit the command information such as information for starting the display of the virtual reality, information for selecting a predetermined video 100 from videos 100 in a plurality of fields stored in the storage unit 11, etc., and the input unit 12 inputs the command information. In addition, the threshold value setting unit 19 sets the threshold value of the acceleration.

Subsequently, in step S20, the user U provides the sign 40. The sign 40 is provided on the floor, the ground, or the rug on which the user U rides in the real world. The sign 40 indicates the origin position X in the real world.

Subsequently, in step S30, the user U stands on or near the sign 40 and operates the controller 30 as necessary. In this way, the origin position setting unit 14 inputs and sets the position of the sign 40 (or the position near the sign 40) as the origin position X of the real world, and matches the origin position X of the real world with the origin position X of the virtual reality, that is, the origin position X in the display of the video 100 in the field of the virtual reality field.

Subsequently, in step S40, the user U moves as necessary from the origin position X, and the current position recognition unit 15 detects and recognizes the current position Y of the user U.

Subsequently, in step S50, the progress direction setting unit 16 calculates the direction of the vector of the current position Y recognized by the current position recognition unit 15 with respect to the origin position X set by the origin position setting unit 14, and sets the progress direction A in the video 100 in the field displayed on the display unit 13 in accordance with the calculated direction of the vector.

Subsequently, in step S60, the distance calculation unit 17 calculates the distance B from the origin position X set by the origin position setting unit 14 to the current position Y recognized by the current position recognition unit 15, and calculates the magnitude of the vector in the progress direction A.

Subsequently, in step S70, the user U performs a predetermined motion, and the motion detector 18 detects the predetermined motion of the user U as acceleration.

Subsequently, in step S80, the determination unit 20 determines a magnitude relationship between the threshold value set by the threshold value setting unit 19 and the acceleration detected by the motion detector 18, and when it is determined that the detected acceleration is larger than the threshold value, the process proceeds to step S90, and the control unit 21 controls the change of the video 100 so that the video 100 in the field progresses in the progress direction A set by the progress direction setting unit 16 according to the distance B calculated by the distance calculation unit 17. In addition, the control unit 21 performs a control operation to change the display state of the display object 13a on the display unit 13 according to the distance B from the origin position X to the current position Y calculated by the distance calculation unit 17, and causes the display unit 13 to perform display. Further, the control unit 21 performs a control operation to change the speed of change of the video 100 in the field according to the distance B from the origin position X to the current position Y calculated by the distance calculation unit 17, and causes the display unit 13 to perform display.

As described above, according to the present embodiment, since the control unit 21 controls the change of the video 100 to cause the video 100 to progress in the progress direction A set by the progress direction setting unit 16, the progress direction A can be set in the direction from the origin position X.

In addition, when the control unit 21 controls the change of the video 100 to cause the video 100 to progress in the progress direction A set by the progress direction setting unit 16 upon detecting a predetermined motion of the user U by the motion detector 18, it is possible to change the video 100 of the virtual reality according to the predetermined motion of the user U.

In addition, since the display of the video 100 includes the display object 13a indicating the progress direction A, the progress direction A can be confirmed by the display object 13a.

Further, since the display state of the display object 13a is changed according to the distance B from the origin position X to the current position Y, the user U can subjectively grasp the distance B from the origin position X to the current position Y.

Furthermore, since the virtual reality system 1 has the sign indicating the origin position X, the user U can confirm the origin position X in the real world.

Note that it is natural that the invention is not limited to the above-described embodiment, and can be variously modified and applied.

That is, for example, the change of the video by the control unit 21 includes a change of the video that causes the video to progress in the progress direction set by the progress direction setting unit 16 and a change of the video other than the change, and the change of the video and the change of the video other than the change may be performed according to the command information input by the input unit 12 and transmitted from the controller 30. That is, the operation of the controller 30 is normally performed by the user U manually operating the operation unit 32, and thus may be a motion distinguished from movement from the origin position X to the current position Y performed by the user U walking with a foot, which is preferable.

In addition, in the above-described embodiment, the control unit 21 is included in the video display apparatus 10. However, the control unit 21 may be included in the controller 30, or included in a plurality of devices such as both the video display apparatus 10 and the controller 30.

Further, even though the motion detector 18 detects acceleration by input from the acceleration sensor 18a, the motion detector 18 may detect various motions such as a hand waving motion, a hip shaking motion, and kicking up of a leg, and the change of the video 100 may be controlled by the control unit 21. That is, the motion detector 18 can produce a desired effect when a predetermined motion of the user U is detected. Note that in such a case, predetermined sensors are provided on an arm, a waist, and a leg so that each motion can be detected.

Furthermore, in the above-described embodiment, the motion detector 18 detects acceleration by input from the acceleration sensor 18a, the threshold value setting unit 19 sets a predetermined threshold value of the acceleration, and the determination unit 20 determines a magnitude relationship between the threshold value set by the threshold value setting unit 19 and the acceleration detected by the motion detector 18. However, by providing the speed sensor or the angular velocity sensor instead of the acceleration sensor 18a, the motion detector 18 may detect the speed or the angular velocity by input from the speed sensor or the angular velocity sensor, the threshold value setting unit 19 may set a predetermined threshold value of the speed or the angular velocity, and the determination unit 20 may determine a magnitude relationship between the threshold value set by the threshold value setting unit 19 and the speed or the angular velocity detected by the motion detector 18. In addition, the acceleration sensor 18a, the velocity sensor, and the angular velocity sensor may be appropriately combined and used.

That is, the motion detector 18 may detect at least one of the speed, the acceleration, and the angular velocity in the motion of the user U, and the control unit 19 may control the change of the video 100 when at least one of the speed, the acceleration, and the angular velocity detected by the determination unit 20 is a predetermined value. The angular velocity sensor may be, for example, a gyro sensor.

REFERENCE SIGNS LIST

A Progress direction
B Distance
U User
U' Head
X Origin position
Y Current position
1 Virtual reality system
10 Video display apparatus
10' Main body
10" Fixing portion
10a Bus
10b Central processing unit
10c Storage device
10d Input device
10e Display device
11 Storage unit
12 Input unit
13 Display unit
13a Display object
14 Origin position setting unit
15 Current position recognition unit
15a Position detector
16 Progress direction setting unit
17 Distance calculation unit
18 Motion detector
19 Threshold value setting unit
20 Determination unit
21 Control unit
30 Controller
31 Main body
32 Operation unit
40 Sign
100 Video
200 Program

The invention claimed is:

1. A virtual reality system having a video display apparatus worn on a user to display a video of virtual reality, the virtual reality system comprising:
   a display unit that is configured to display the video including a predetermined display object;
   a control unit that is configured to control a change of the video displayed on the display unit;
   an origin position setting unit that is configured to set an origin position;
   a current position recognition unit that is configured to detect and recognize a current position of the user; and
   a progress direction setting unit that is configured to calculate a direction of the current position recognized by the current position recognition unit with respect to the origin position set by the origin position setting unit, and set a progress direction in the displayed video in accordance with the direction, and
   a distance calculation unit that is configured to calculate a distance from the origin position to the current position, wherein a position of the display object is changed in accordance with the distance from the origin position to the current position calculated by the distance calculation unit;
   and the control unit is further configured to control a change of the video to cause the video to progress in a progress direction set by the progress direction setting unit.

2. The virtual reality system according to claim 1, further comprising:
   a motion detector that is configured to detect a predetermined motion of the user, wherein when the predetermined motion of the user is detected by the motion detector, the control unit is further configured to control a change of the video to cause the video to progress in a progress direction set by the progress direction setting unit.

3. The virtual reality system according to claim 2, wherein the motion detector is configured to detect acceleration and/or an angular velocity in a motion of the user, and the control unit is further configured to control a change of the video when at least one of a speed, acceleration, and an angular velocity detected by the determination unit is a predetermined value.

4. The virtual reality system according to claim 3, wherein the control unit is further configured to change the speed of a change of the video in accordance with acceleration and/or an angular velocity in a motion of the user detected by the motion detector.

5. The virtual reality system according to claim 1, wherein the predetermined display object includes a display object indicating a progress direction set by the progress direction setting unit.

6. The virtual reality system according to claim 5, wherein a display state of the display object is changed in accordance with a distance from the origin position to the current position calculated by the distance calculation unit.

7. The virtual reality system according to claim 1, wherein a display state of the display object is changed in accordance with a distance from the origin position to the current position calculated by the distance calculation unit.

8. The virtual reality system according to claim 1, wherein a size of the display object is changed in accordance with a distance from the origin position to the current position calculated by the distance calculation unit.

9. The virtual reality system according to claim 1, further comprising:
a controller operated by the user that is configured to receive predetermined command information from the user, the change of the video by the control unit including a first change of the video for causing the video to progress in a progress direction set by the progress direction setting unit and a second change of the video other than the first change, wherein the controller is configured to be communicable with the video display apparatus, and transmit the received command information to an input unit of the video display apparatus, and the change of the video by the control unit is performed according to the command information input by the input unit.

10. The virtual reality system according to claim 9, wherein the control unit, the origin position setting unit, the current position recognition unit, the progress direction setting unit, the motion detector, the threshold value setting unit, the determination unit, the distance calculation unit, and the input unit are included in the video display apparatus.

11. The virtual reality system according to claim 1, further comprising:
a sign indicating the origin position.

12. The virtual reality system according to claim 11, further comprising:
a floor, a ground, or a rug on which the user rides including the sign in the real world.

13. The virtual reality system according to claim 11, wherein the sign has a three-dimensional shape.

14. The virtual reality system according to claim 1, wherein the display of the video of the virtual reality is display of a three-dimensional virtual reality video.

15. A non-transitory computer-readable storage medium configured to provide instructions executed by a computer of a virtual reality system including a video display apparatus worn on a user to display a video of virtual reality, the non-transitory computer-readable storage medium comprising:
instructions to display the video including a predetermined display object;
instructions to control a change of the video displayed on the display unit;
instructions to set an origin position;
instructions to detect and recognize a current position of the user;
instructions to calculate a direction of the current position with respect to the origin position, wherein a position of the display object is changed in accordance with the distance from the origin position to the current position;
instructions to set a progress direction in the displayed video in accordance with the direction;
instructions to detect a predetermined motion of the user; and
instructions to control a change of the video to cause the video to progress in a progress direction set by the progress direction setting unit when a predetermined motion of the user is detected by the motion detector.

* * * * *